G. C. CARSON.
PROCESS FOR TREATING ORES AND METALS IN REVERBERATORY FURNACES.
APPLICATION FILED OCT. 4, 1916.
1,296,478.
Patented Mar. 4, 1919.
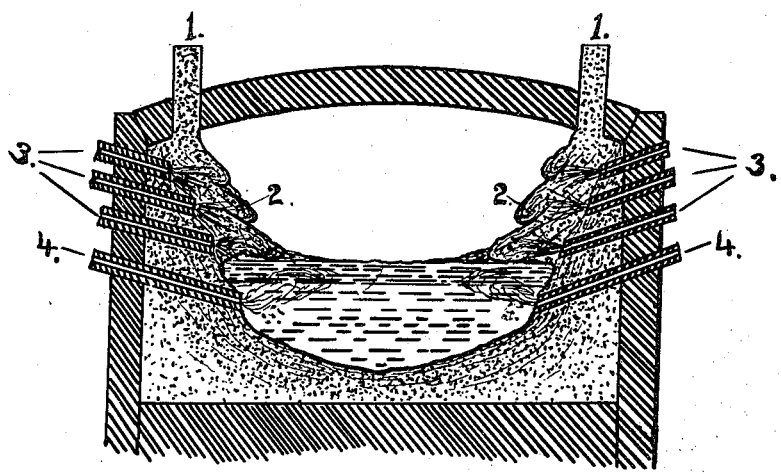
WITNESS:
INVENTOR.

UNITED STATES PATENT OFFICE.

GEORGE CAMPBELL CARSON, OF SAN FRANCISCO, CALIFORNIA.

PROCESS FOR TREATING ORES AND METALS IN REVERBERATORY FURNACES.

1,296,478. Specification of Letters Patent. Patented Mar. 4, 1919.

Application filed October 4, 1916. Serial No. 123,967.

*To all whom it may concern:*

Be it known that I, GEORGE CAMPBELL CARSON, a citizen of the United States, who resides at 89 Broadway street, San Francisco, California, have invented a new and useful Process for Treating Ores and Metals in Reverberatory Furnaces, of which the following is a specification.

My invention relates to increasing the quantity of ore smelted heretofore in reverberatory furnaces, to the utilization of the heat of combustion of oxygen and sulfur and oxygen and iron in the ores smelted by the process and the elimination of the calcining required in present practice, and the yielding of a high grade matte for conversion; or the manufacturing of bullion.

The preliminary calcining of the ores to be smelted can be dispensed with by my process, but calcines can be added to the smelting mixture if desired, or the process can be entirely operated upon calcines, but greater economies are secured by the oxidation of all of the sulfur and of the iron within the reverberatory, than is effected by giving the ores or concentrates a preliminary roast. The saving secured by treating the raw ores and concentrates are: no roasting plant is required and the labor, transportation and equipment to operate a roasting plant, and to deliver calcines to the furnace.

The metallurgical advantages of the process are: By the oxidation of all the sulfur within the reverberatory, all of the heat of combustion of sulfur and oxygen is available as fuel for smelting. The reducing power of the sulfur creates a large matte fall which leaves a cleaner slag. The sulfur and iron in the matte after carrying values from the slag to the metal pool upon the hearth of the furnace, are in their turn oxidized; they communicate their heat of combination to the metal pool, and the slag blanket above the metal pool, and the material being smelted. The oxidized iron yielded by the matte is available to neutralize silica, thus enabling the manufacturing of a slag higher in silica at a higher temperature than what it would be possible to do by smelting calcines with usual matte fall and removing the matte from the furnace to converters and returning the converter slag to the furnace. Also the walls of the furnace are protected from erosion during smelting and bessemerizing—thus saving converter linings.

This process is carried on in a reverberatory furnace which is charged through the roof along the side walls and is for the purpose of increasing the smelting capacity of that type of furnace. See Patent Number 1,149,495 issued to me Aug. 10—1915.

In operating the process, the furnace is brought to its working temperature in the usual way and the embankment against the furnace walls is made by feeding ores or concentrates, or calcines through the roof of the furnace along the side walls.

Twyers are placed so as to pierce the embankment and discharge a blast of air in the matte horizon. The best result is obtained if the twyers discharge just beneath the surface of the metal pool and beneath the slag stratum so that metal which has given up its iron or sulfur can settle below the twyers and be protected from oxidation or chilling by the blast, and the matte falling out of the slag stratum into the metal pool will be subjected to the blast of air delivered by the twyers.

The blast of air delivered through the charge embankment supplies the oxygen for oxidizing the sulfur and iron in the metal pool and rapidly dissolves the charge embankment along the shore of slag and metal pool by slagging and oxidizing the embankment, thus causing the embankment to melt and sink rapidly into slag and metal pool and greatly expediting smelting by the formation of iron oxid to combine with silica in the embankment, and the intense heat caused by the reactions created by the blast of air.

Smelting is promoted and the capacity of the furnace increased by saturating the embankment itself with air which is effected by placing twyers to discharge air into it at different horizons of the embankment. I have shown three sets of twyers in the drawing so discharging air, which requires less air pressure than is required by the bessemerizing twyers piercing the matte below the slag stratum.

With my invention the capacity of the furnace is controlled by the quantity of air supplied thereto, as the fuel value of the sulfur and iron in most ores and concentrates is sufficient to supply the heat for smelting after the furnace has reached its working temperature and only enough fuel will have to be utilized to maintain that temperature, whereas that heat within the ores and concentrates is now lost in the roasting process;

also, the rapidity of the operation enables the construction of smaller furnaces, and therefore saves heat lost in larger furnaces through conduction or radiation.

The process is further illustrated with reference to the accompanying drawing which is a cross-section of a side feeding reverberatory furnace showing the charge fed along the walls forming a sloping embankment resting on the floor of the furnace and against the walls of the furnace. Twyers are piercing the embankment to supply oxygen for oxidation of the sulfur and iron in the sulfids of the smelting charge, while the lower twyers penetrate to the horizon of the matte beneath the slag and is for the purpose of bessemerizing the matte yielded from the smelting of the embankment.

1. shows the smelting charge entering the furnace; 2., the sloping embankment resting upon the floor of the furnace and against the furnace walls; 3., twyers penetrating the embankment for the purpose of supplying oxygen thereto; 4., twyers for bessemerizing the matte undergoing treatment,

Having thus described my process, what I claim as new and desire to secure by Letters Patent is:—

1. The process of smelting sulfur and iron-bearing copper ores or concentrates consisting in charging the material to form a sloping embankment against the walls of a furnace chamber, delivering a blast of air to the interior slope of the embankment to oxidize sulfur and iron compounds and for smelting the material.

2. The process of smelting sulfur and copper bearing materials consisting in charging the material to form sloping embankments against the walls of a furnace chamber, delivering a blast of air into the copper matte that accumulates at the foot of the embankments.

3. The process of treating uncalcined ores or concentrates consisting of charging the material so as to form a sloping embankment along the walls of a furnace chamber, smelting said material, utilizing the sulfur of said material to produce copper matte, bessemerizing said copper matte within said furnace.

4. The duplex process consisting of smelting and simultaneously bessemerizing ores or concentrates by charging the materials so as to form a sloping embankment against the walls of a furnace chamber, and smelting upon the slopes of said embankments and bessemerizing the matte produced thereby.

5. The duplex process consisting of simultaneously smelting and bessemerizing ores and concentrates by charging the materials so as to form sloping embankments against the walls of the furnace chamber, smelting the material upon the slope of said embankments and accumulating the slag and metal produced thereby at the foot of said embankments, bessemerizing said metal within said chamber, utilizing the heat of oxidation of the sulfids of said materials and metal to smelt with.

GEORGE CAMPBELL CARSON.

Witnesses:
F. H. GOULD,
B. A. TIMMONDS.